UNITED STATES PATENT OFFICE.

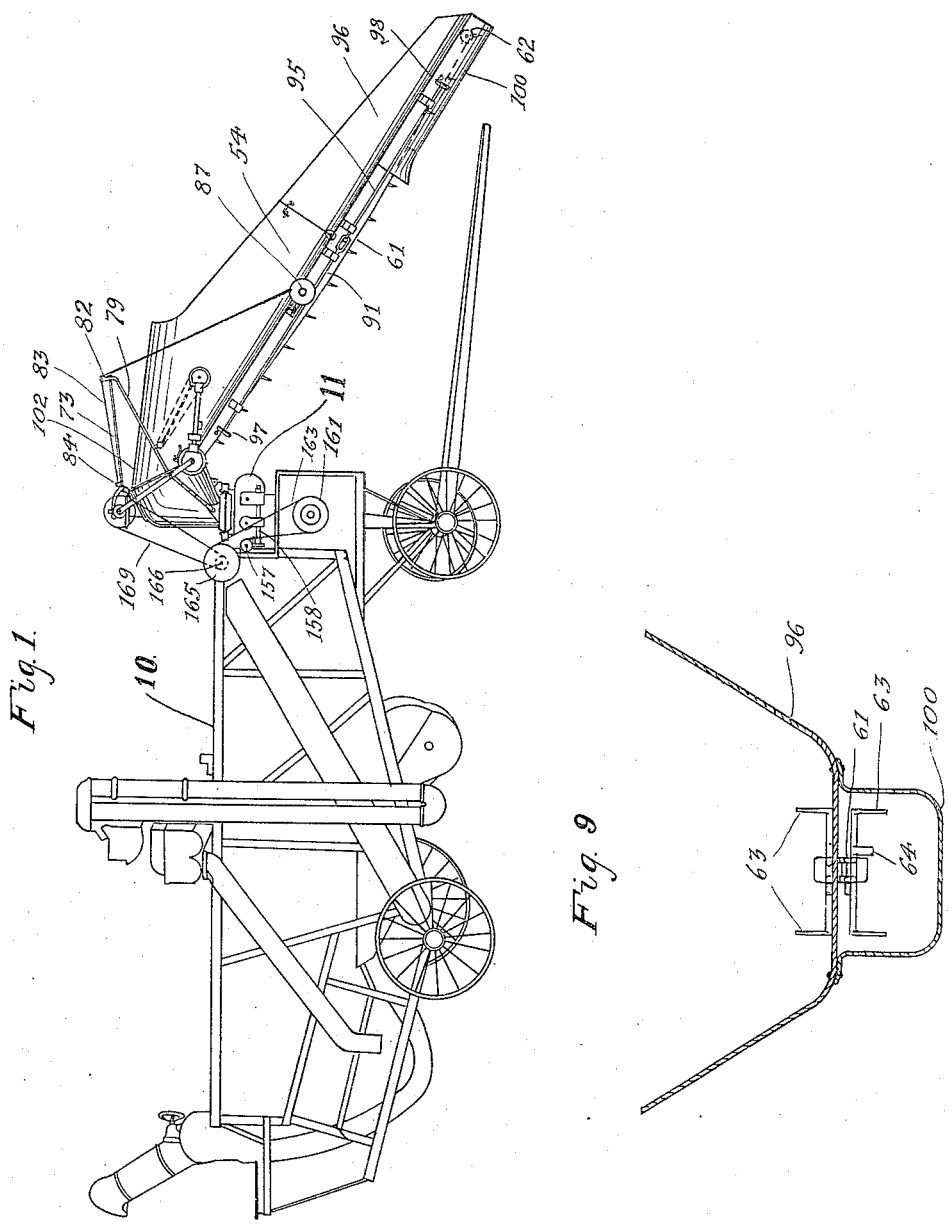

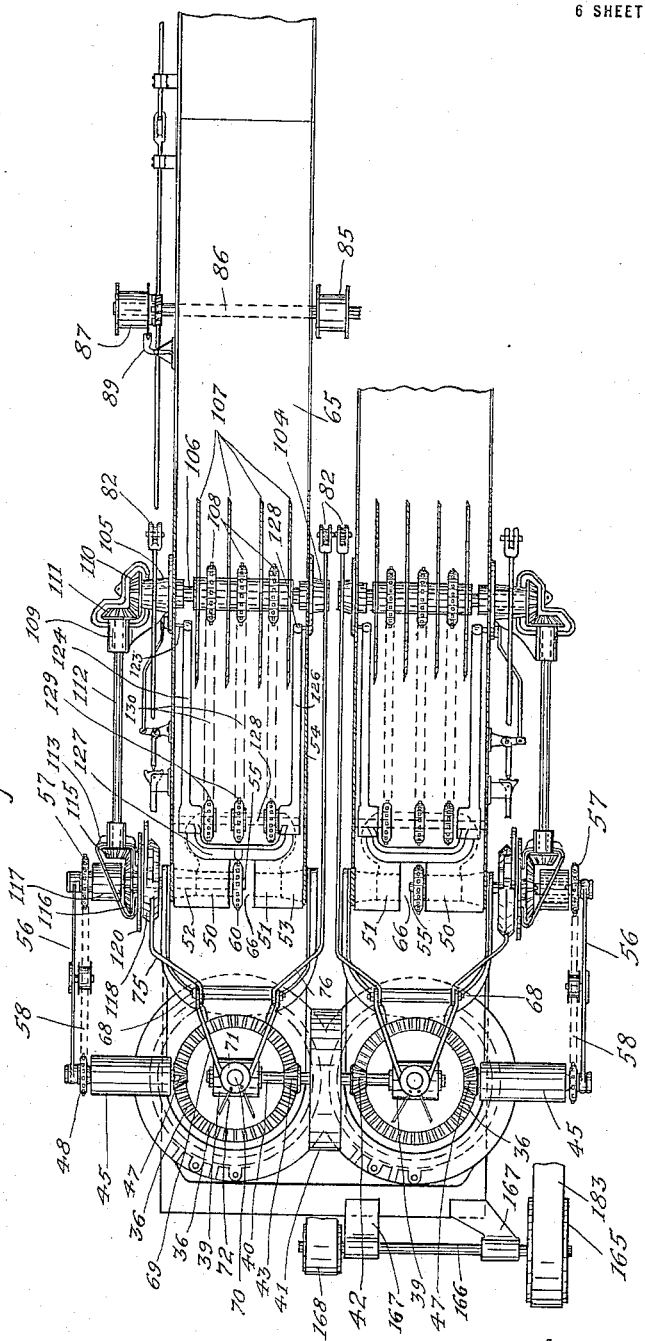

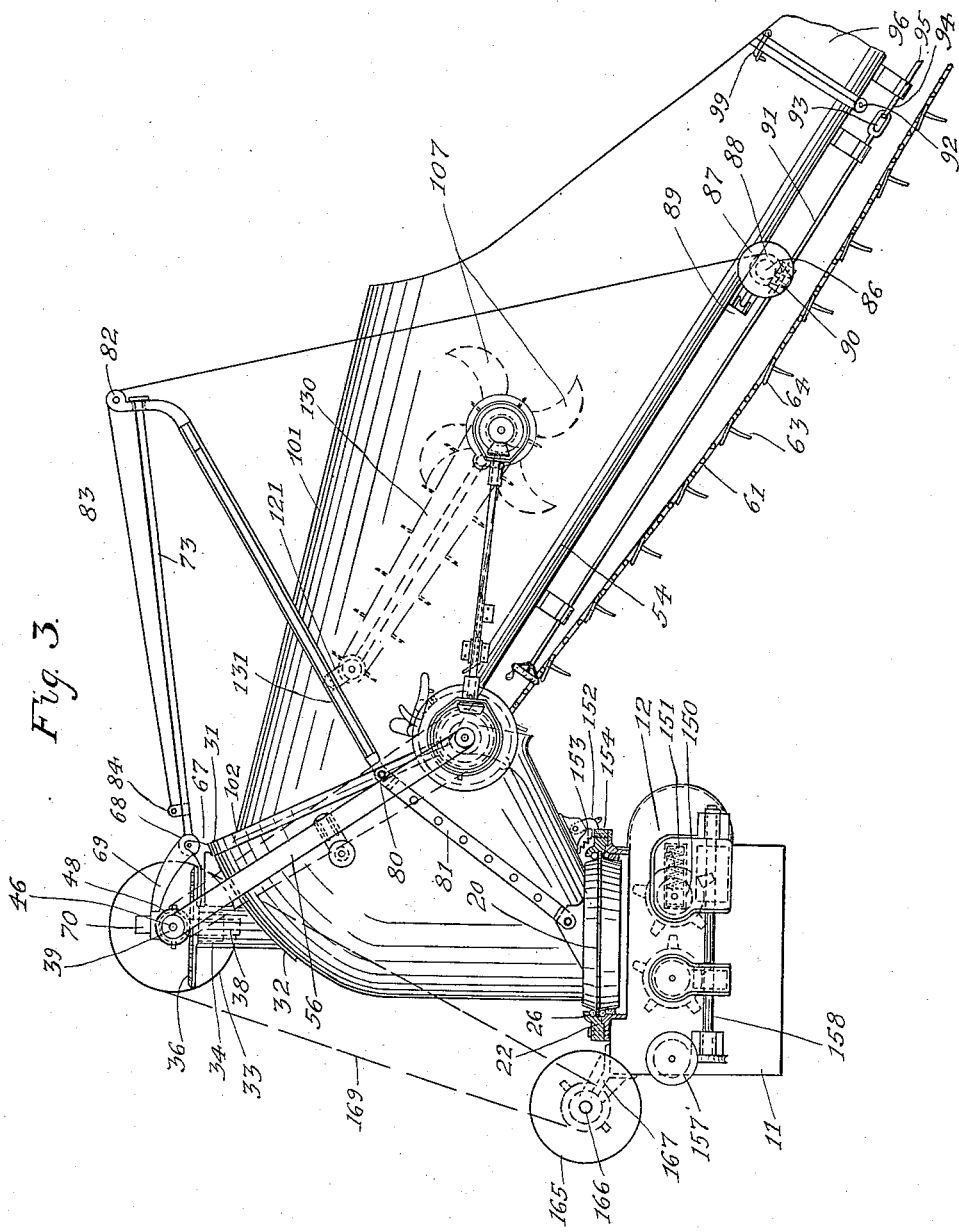

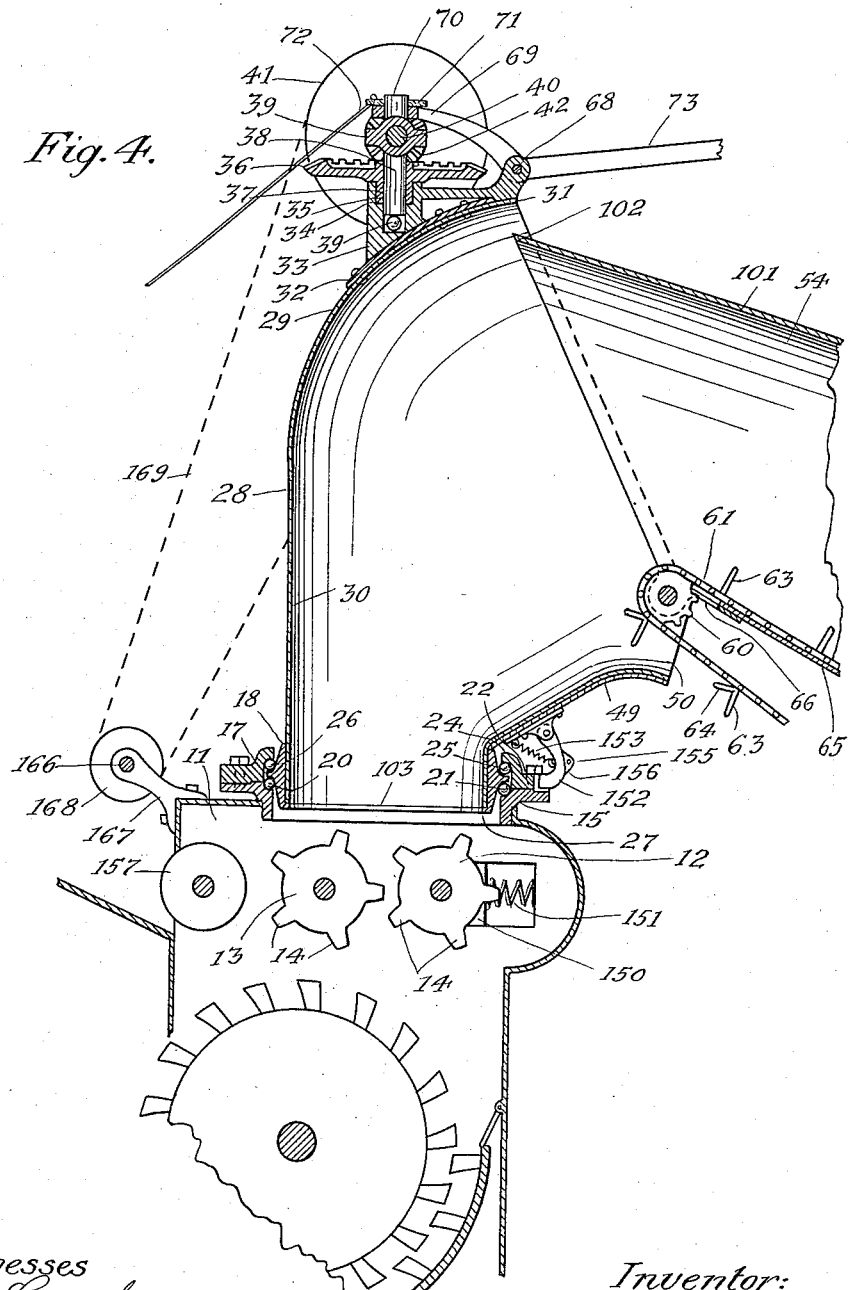

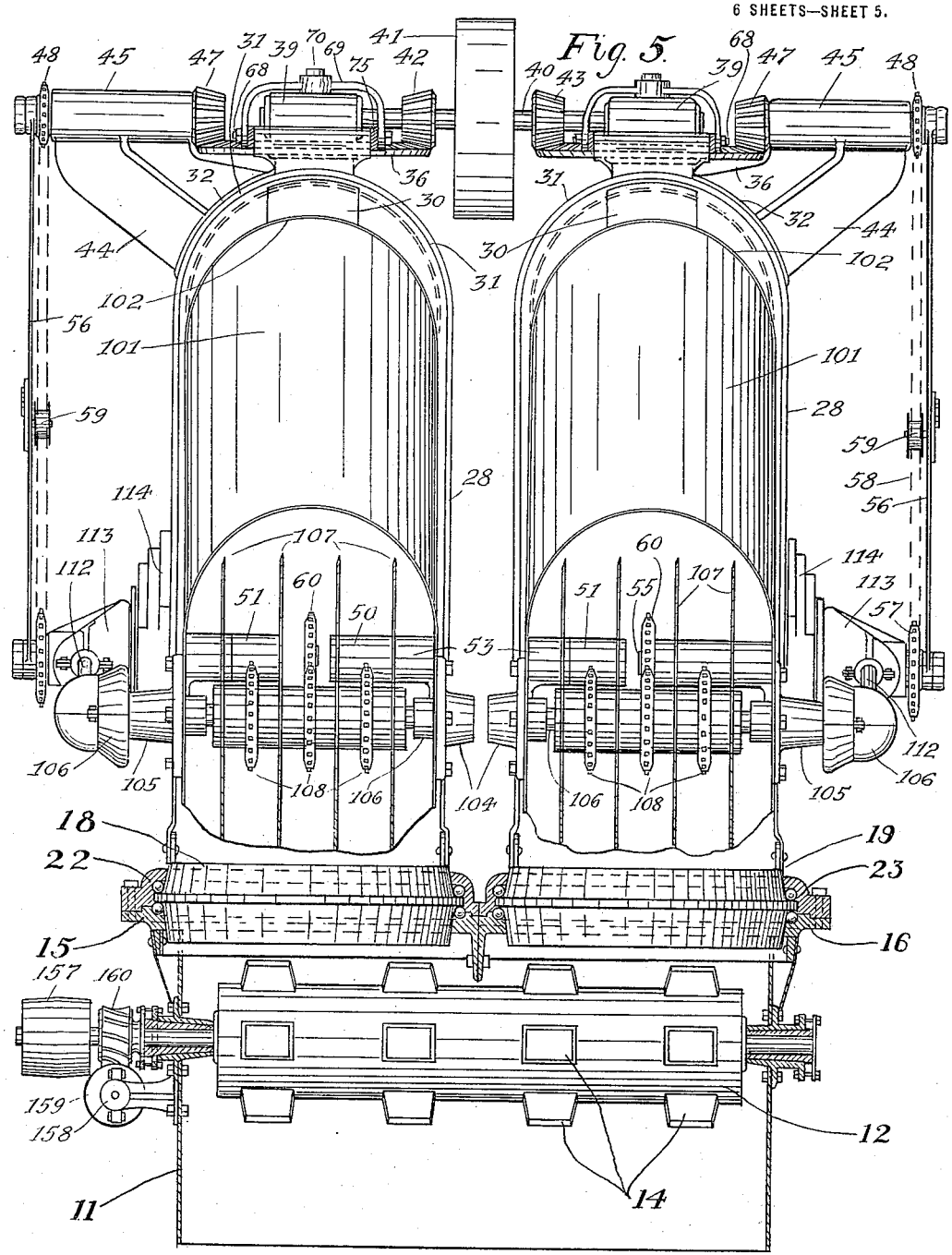

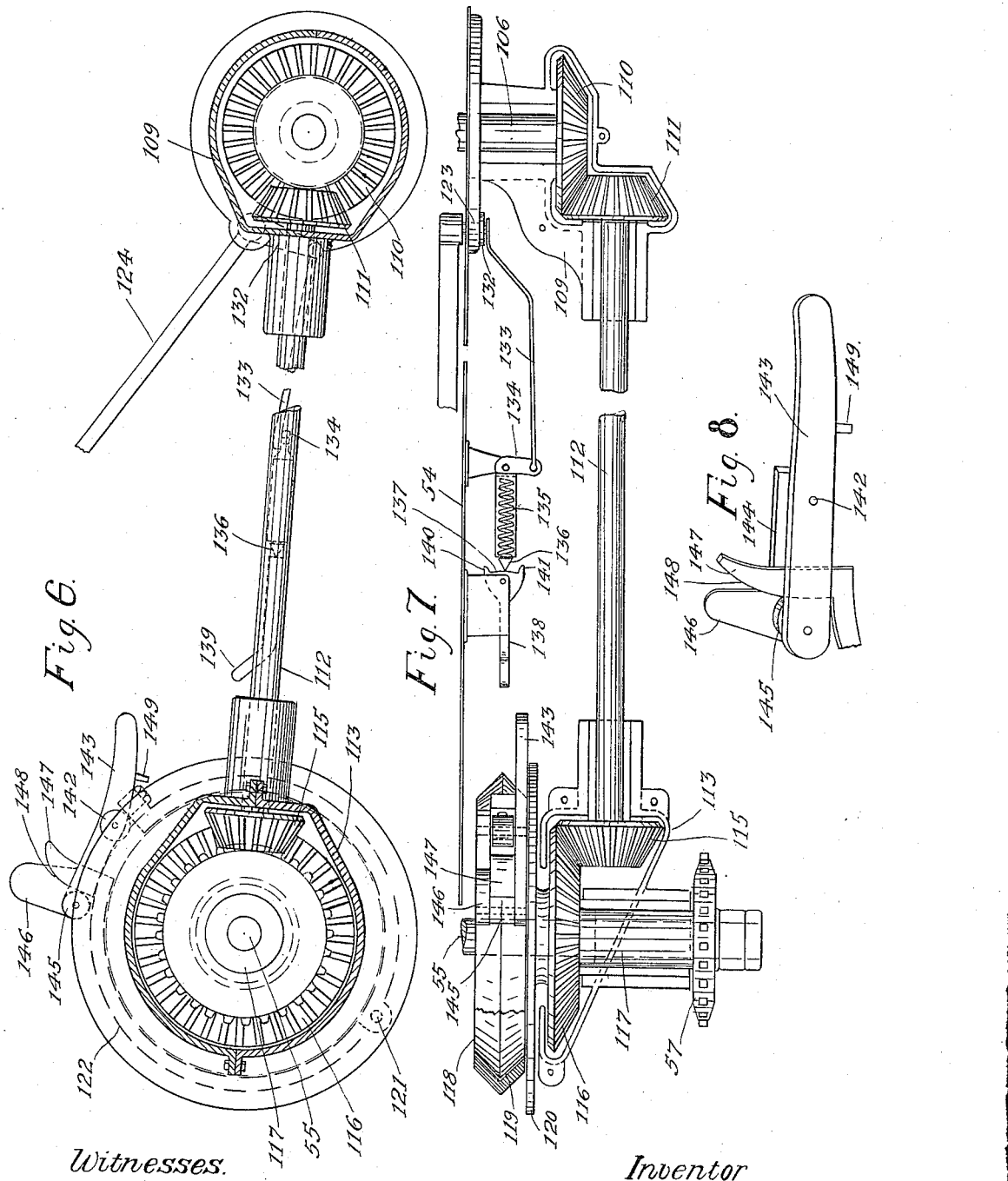

ANDREW J. PETERSON, OF ISANTI, MINNESOTA.

BAND-CUTTER AND FEEDER FOR THRESHING-MACHINES.

1,146,900. Specification of Letters Patent. Patented July 20, 1915.

Application filed July 22, 1912. Serial No. 710,858.

*To all whom it may concern:*

Be it known that I, ANDREW J. PETERSON, a citizen of the United States, residing at Isanti, in the county of Isanti and State of Minnesota, have invented certain new and useful Improvements in Band-Cutters and Feeders for Threshing-Machines, of which the following is a specification.

My invention relates to band cutters and feeders for threshing machines and has for its object to receive bundles at a point removed from the separator and convey said bundles to a point above the threshing cylinder, cutting the bands while the bundles are being moved and spreading and distributing the grain so as to deliver the same in a constant stream to the threshing cylinder.

It is an object of my invention to provide a feeder which includes a carrier and feeder chute which shall be mounted for oscillation in a horizontal plane directly above the threshing cylinder, said chute having a circular mouth opening above the feeding rollers at a point such that said rollers can receive and deliver to the threshing cylinder the cut and distributed bundles of grain brought up by the carrier.

It is a further object of my invention to provide in the carrier trough a constantly driven set of cutter knives in combination with a series of rider chains also constantly driven, said rider chains being adapted to float upon the bundles fed upward along the carrier. With this rider mechanism is combined means for disconnecting the endless belt operating in the carrier trough whenever the amount of grain fed becomes greater than a certain desired amount.

It is an essential object of my invention to provide rider mechanism of the type above described which shall operate to assist in forwarding the grain when the main conveyer belt is being driven and which itself will operate to feed forward the top layers of grain independent of the conveyer belt when the conveyer belt is disconnected.

It is a further object of my invention to connect the feeder chute and the carrier section by a hinge joint at the axial center of the mechanism for driving the conveyer belt and band cutter and rider chains and to provide special means for raising and lowering the carrier which can at will be operatively disconnected therefrom.

It is a further object of my invention to provide in connection with the end of the carrier a guard or shield to rest upon the top of a straw stack thereby supporting the end of the carrier which may then drop as the height of the straw stack is lowered from the feeding of the bundles to the separator.

The full objects and advantages of my invention will appear in connection with the detailed description thereof and are particularly pointed out in the claims.

In the drawings, illustrating the application of my invention in one form,—Figure 1 is a side elevation of a separator showing my invention applied thereto. Fig. 2 is a plan view of the feeder mechanism. Fig. 3 is an enlarged side elevation of the feeder mechanism. Fig. 4 is a transverse section of the feeder mechanism, as applied to a separator. Fig. 5 is a front elevation of a feeder mechanism with the carriers turned down and broken away at the ends and the front of the feeder casing removed. Figs. 6 and 7 are side and plan views, respectively, the latter partly in section of the driving mechanism and control therefor of the conveyer belt and band cutter and rider chains. Fig. 8 is a detail view of a clutch band operating lever. Fig. 9 is a transverse section of the end of the carrier.

Secured to the forward portion of the frame 10 of a separator of ordinary construction, such as shown in Fig. 1, is a feeder casing 11 open at top and bottom and having journaled therein a pair of rollers 12, 13, each of said rollers being provided with a series of large lug-like teeth 14, the shape of which is clearly indicated in Figs. 4 and 5. Secured upon the top of casing 11 are a pair of flanged rings 15 and 16 each formed with a groove 17 circular in cross section extending about the upper edge of the inner periphery thereof. Supported by the rings 15 and 16 are frame rings 18 and 19, said frame rings being provided with central outwardly extended peripheral flanges 20 which flanges rest directly upon a series of balls 21 positioned in the grooves 17 and engaging not only the flanges 20 but also the outer beveled periphery of the rings 18 and 19. As best shown in Fig. 4, there are bolted to the rings 15 and 16 keeper rings 22 and 23 which are provided with upwardly extended flanges 24 formed with grooves 25 on the inner surface thereof for holding balls 26 which operate between the grooves 25 and the flanges 20 to hold the frame rings 18 and 19 in a fixed horizontal position and yet free to oscillate with the parts carried thereby upon the flanges 20.

The ring 18 is provided with a lower inwardly turned flange 27 around the bottom periphery thereof. Seated within this flange and extending upwardly from out the ring is a casing 28 which is curved at the top of the backside thereof, as indicated at 29, and which has secured along the interior of said backside a reinforcing strip 30. The casing 28 terminates in a curved upper portion 31, as best shown in Fig. 5. The flanged base 32 of a casting later to be described is bolted to the curved top portion 29, said base extending to the upper curved lip 31 thereof as best shown in Figs. 3 and 4. This casting has upstanding from the base 32 a standard 33 formed with an interior bearing 34 in which is seated a hub sleeve 35 of a bevel gear 36. The said bevel gear is formed with a central bore 37 as best shown in Fig. 4, through which extends a shaft 38 having if desired a ball bearing 39 in the standard 33. Integrally secured to the shaft or spindle 38 is a bearing block 39 and journaled in the two bearing blocks 39 of the two sets of carriers provided in the preferred form of my invention shown is a shaft 40 having thereon a pulley 41 and a pair of bevel gears 42 and 43 meshing with the respective bevel gears 36 on the aforesaid two carrier units.

It is obvious that if desired but a single carrier unit may be employed and fall within the scope of my invention. The form shown in which a pair of carrier units is employed will, however, in practice give the most satisfactory results.

A bracket arm 44 is integrally formed upon each casting base 32 carrying a sleeve bearing 45 in which is journaled a short shaft 46 having on one end thereof a bevel pinion 47 meshing with bevel gear 36 and on the other end a sprocket wheel 48.

As best shown in Fig. 4, the lower portion of casing 28 is provided with reinforcing ribs 49 having upstanding bracket bearing blocks 50 and 51 to which are hinged by means of hubs 52 and 53 respectively, the main carrier sections 54, said hubs 52 and 53 coming outside of bearing blocks 50 and 51 and being hingedly secured thereto by spindles passing through the centers of hub 53 and bearing block 51 and hub 52 and bearing block 50, the spindle passing through hub 52 and bearing block 50 being in fact a shaft 55. The shaft 55 extends for some distance outside of bearing block 52 and is supported at the end by means of a link 56 having a bearing on the end of shaft 46 and another bearing on the end of the aforesaid shaft 55. Inside of said bearing of link 56 is a sprocket wheel 57 on shaft 55 which is connected with sprocket wheel 48 on shaft 46 by means of a sprocket chain 58, a guide sheave 59 for said sprocket chain being secured to link 56 at near the central part thereof. Upon the inside of each of shafts 55 at a point inside of bearing block 50 and near the center of carrier trough 54 is a sprocket wheel 60 over which runs a sprocket chain 61, said sprocket chain extending about a similar sprocket wheel 62 journaled at the outer end of the carrier trough 54. As best shown in Figs. 3, 4 and 9, the sprocket chain 61 is provided with a series of swiveled prongs 63 having feet 64 which engage the bottom wall 65 of the carrier trough 54 thereby holding the prongs 63 in raised position as the carrier chain travels up the carrier trough. As best shown in Fig. 2, the said bottom wall 65 of carrier trough 54 extends above and slightly beyond the hubs 52 and 53 thereon and is formed with a slot 66 through which sprocket wheel 60 extends, said slot running beyond said sprocket wheel beneath the end of bearing block 51. When the feet 64 come into the slot 66 the prongs are permitted to swing backward into the plane of the chain and release the hold upon the bundles carried thereby.

As best shown in Figs. 2 and 3, the casting base 32 is thrown up in an ear-like bracket 67 through which extends a bolt 68 and on this bolt is strung a two-armed member 69 which extends backwardly so as to rest upon the bearing block 39, said member 69 having formed on the top thereof a lug 70 upon which may be secured an eye-plate 71 from which extends a series of guy wires 72 to fixed parts of the machine. To the bolt 68 is pivoted at each end thereof and inside of the arms of member 69 a pair of arms or rods 73 and 74 which arms are bent outwardly, as indicated at 75 and 76, and are extended parallel to the sides of the carrier 54. The rods 73 and 74 pass through enlarged apertures 78 in arms 79 pivoted at 80 to the ends of brace members 81 bolted to the side walls of casing 28, the members 79 being restrained from movement beyond a certain point by heads 77 on the arms 73 and 74. The rods 73 and 74, therefore, pivoted to bolt 68 in combination with the side rods 79 pivoted to bars 81 at a point on casing 28 some distance below the bolt 68, form a truss suspension device which is capable of oscillation upwardly above the limits set by the heads 77 and which is restrained by said heads in a fixed lowered position. The purpose of this feature of my device relates to one of the primary objects of my invention and will now be described.

Upon the upper ends of rod 79 are journaled pulleys 82 from which extend cables 83. One end of each cable is secured to an eye-piece 84 on rods 73 and 74. The other end of one of said cables is secured to a drum 85 fast on a shaft 86 extending beneath the carrier trough 54 and journaled thereto, the other end of the other cable extending from pulley 82 to a drum 87 splined and slidable on shaft 86. A worm wheel 88 is loose on shaft 86 and has a clutch face adapted to coöperate with a clutch face on drum 87 which is moved into and out of clutching engagement therewith by means of a hand lever 89. Coöperating with the worm wheel 88 is a worm 90 (shown in dotted lines in Fig. 3), which worm is on a shaft 91 journaled in bearings below carrier chute 54. For convenience in handling, the carrier chute is hinged at 92 and at this point the shaft 91 is provided with a slotted head 93 forming a union with a similar slotted head 94 of an extension rod 95 journaled to the lower section 96 of the carrier. Upon the free end of rod 91 is a hand wheel 97, which will be near the upper portion of the carrier and accessible from the top of the machine. A similar hand wheel 98 is provided on the end of the extension shaft 95, which is near the outer end carrier section 96. When the drum 87 is clutched to worm wheel 88, by turning either shaft 91 through hand wheel 97 or shaft 95 through hand wheel 98 drums 87 and 85 will be rotated winding up or unwinding cords 82 and elevating or lowering the carrier section 54, and, of course, with it the carrier section 96 hinged thereto, and which will be secured in practical alinement with section 54 by hooks 99, as indicated in Fig. 3.

In certain instances it may be desirable to rest the outer end of carrier section 96 upon the stack and let it go down by gravity as the bundles of a stack are fed to the threshing machine. To permit this the outer carrier section 96 has formed on the lower side thereof a special casing or shoe 100 which extends beyond and forms a guard for the conveyer chain 61 and the prongs 63. When so used the drum 87 will be unclutched from worm wheel 88 and the guard casing 100 will rest upon the surface of the straw stack. As the bundles are deposited in carriers 96 and fed into the hoods 28 the carrier trough will, by gravity, be caused to follow the diminishing height of the stack until the bottom of the stack is reached. In this way the operator will not at any time need to lift the bundles but merely toss or shove them into the end of the carrier section 96 at all times practically at the level of the bundles being handled. It will, of course, be understood that the above structures are duplicated for each of the carrier troughs 54 which may be employed. It will be noted, as best shown in Figs. 4 and 5, that the carrier trough 54 is arched over for a portion of its upper surface, as indicated at 101, the upper edge 102 of such arched portion extending adjacent to the front edge 31 of the hood casing 28 when the carrier trough is in its most lowered position with the free end upon the ground, as indicated in Fig. 1. The said upper edge 102 of the carrier section 54 telescopes within the hood casing 28 as said carrier trough is oscillated upon the hinge members 52 and 53. The discharge from the carrier troughs 54 therefore will always be entirely within the hood casings 28 so that the bundles of grain will be delivered therein and pass through the circular apertures 103 at the bottom of rings 18.

In addition to driving the sprocket wheel 60 and carrier chain 61 from the shaft 55 at the point of pivotal attachment of carrier troughs 54 to hood casing 28, I drive from the same shaft the means for cutting the bands and also my specially contrived device for regulating the rate of feed and delivery of grain from the carrier trough into the hood casing. Bolted to the side walls of each of the carrier sections 54, as best shown in Fig. 5, are bearing members 104 and 105 in which is journaled a shaft 106 carrying a series of cutter blades 107 and an intermediate series of sprocket wheels 108, all within the carrier trough and between the side walls thereof. Secured to bearing member 105 is a gear casing 109 of common construction in which is housed a bevel gear 110 on the end of shaft 106, said bevel gear meshing with a bevel gear 111 on the end of a shaft 112 having a bearing in the gear casing 109 adjacent one end thereof and another bearing in a gear casing 113 secured, as indicated at 114, to the side wall of carrier trough 54. The shaft 112 has on the end thereof a bevel gear 115 within housing 113 meshing with a bevel gear 116 on a sleeve 117 loose on shaft 55 and upon which is secured the sprocket wheel 57 before mentioned, which with sleeve 117 is loose on shaft 55, all as best shown in Figs. 6 and 7. Fast on shaft 55 is a clutch wheel 118 provided with a V-shaped rim as indicated at 119. Secured to the hub of bevel gear 116 is a disk 120 having secured thereto at the middle point thereof by means of a bolt 121 a clutch ring 122 having an interior V-shaped bearing surface similar to the surface 119 on clutch wheel 118. When the clutch band 122 is drawn in so as to grip the periphery of clutch wheel 118 the gear 116 will thereby be clutched to shaft 55 and sprocket wheel 60 will be rotated to drive the feeder chain 61.

It is thus seen that the shaft 106 and cutter knives 107 thereon are constantly driven while the sprocket wheel 60 and feeder chain 61 will be or may be intermittently driven as the feeding requirements of the machine may necessitate. To control this intermittent operation of the feeder chain 61 and also as a means of materially aiding in the feed of grain after the bundles have passed the cutter knives and the bands been cut thereby, I have provided the following novel device. Pivotally secured to the bearing member 105 at 123 by means of one arm 124 and pivotally secured to bearing member 104 at 125 by means of a second arm 126 is a yoke member 127 having journaled therein between said arms 124 and 126 a shaft 128 having thereon a series of sprocket wheels 129 which are connected by sprocket chains 130 with the sprockets 108 on shaft 106. The gearing to the shaft 106 relative to the drive of feeder chain 61 is such that the sprocket chains 130 travel more rapidly than said feeder chain but in the portion adjacent said feeder chain travel in the same direction. The links of the sprocket chains 130 are provided with projections which engage the sheet of straw at the top of the bundles after the same have been fed beneath the cutters 107 and strip off the top layers of said straw to feed the same into the hood casings 28. The yoke member 127 or rather the chains 130 mounted thereon float upon the bundles of grain which may be fed beneath it, being limited in its downward movement by engagement with lugs 131 on the inside walls of carrier section 54, as indicated in dotted lines in Fig. 3.

The pivot pin 123 of the arm 124 of yoke member 127 extends to the outside of the wall of carrier trough 54 and has secured thereon an arm 132 which arm is connected by link 133 with a short arm 134 of a trip member 135 having housed therein a trigger 136 which is spring-pressed against the head 137 of a trip finger 138 curved upwardly, as indicated at 139. The head 137 of trip finger 138 is provided with marginal stops or wings 140 and 141. As shown in Fig. 7, the trigger 136 is indicated as positioned at the center of head 137, but in practice it will ordinarily occupy a position in engagement either with stop 140 or stop 141 in which case the spring pressure exerted upon trigger 136 will swing the trip finger 138 into one or the other of its side positions, as indicated in dotted lines in Fig. 7. The movements of the trip member 135 are, of course, effected by the rocking movement of the yoke member 127. If the bundles pass under the chains 130 in such numbers or thickness as to lift said chains and yoke member or float the trip member 135 will be thrown outwardly and the trip finger 138 or the extremity 139 will be moved into one of its extreme positions.

The clutch ring 122 has pivoted to one end thereof at 142 a controlling member, which is shown in perspective in Fig. 8, said controlling member comprising an arm 143 extending outside of connecting point 142 and a parallel arm 144 between the ends of which is mounted a roller 145, the arm 144 being provided with an upstanding lug 146. The other end of the clutch band is formed with a cam arm 147 the curved face 148 of which engages the roller 145 between the arms 143 and 144. When the roller 145 is pushed down along the cam surface 148 into engagement with clutch band 122 the said band will be drawn together so as to cause the same to grip the clutch wheel 118. When, however, the roller 145 is caused to move up to near the top of cam surface 148 the clutch band 122 will be released. In one position of the finger 139 said finger will be engaged by the projection 146 which thereby will be caused to force roller 145 into its lower or clutching position. This will always take place when the chains 130 are in normal feeding position. When, however, the yoke member 127 and chains 130 are raised by excessive feed of grain beneath such chains the finger 139 will be positioned so that the arm 143 will engage the same, which will swing said arm on the pivot 142 causing roller 145 to ride up the cam surface 148 of arm 147 and release the clutch ring 122. At such times the sprocket wheel 60 and feeding chain 61 will not be driven until the chains 130 have removed from the top of the bundles of straw beneath the same sufficient grain to permit the yoke member 128 to descend sufficiently to swing trip member 135 and trigger 136 into the opposite position in which finger 139 will come into the path of projection 146 and force the roller 145 down the cam face 148, again effecting clutching action of the clutch ring 122. A lug 149 on the lower side of arm 143 limits the extent of movement of said arm for clutching action.

It will be noted that, as indicated in Fig. 3, the roller 12 is mounted upon sliding bearings 150 which are pressed by springs 151 normally holding roller 12 in its closed position relative to roller 13 but permitting said rollers to separate relatively to accommodate any excessive flow of grain between the same. The character of the lug teeth 14 on the rollers 12 and 13 is such as to hold back and retard the grain after the same has been gripped by the teeth of the threshing cylinder 151 thus preventing jamming between the cylinder and concave and consequent jumping of the separator mechanism.

To hold the hoods 28 and carrier troughs 54 in fixed relative position a catch 152 may be provided normally held out of engagement with ring 22 by means of a spring 153, capable of being drawn down into notches 154 formed on said ring by means of a cord 155 extending from a lug 156 on said catch 152.

The drive of the feed rollers 12 and 13 is effected from a pulley 157 on a shaft 157' which, through a worm gear, drives a shaft 158 having spiral gears 159 thereon in mesh with spiral gears 160 on the shafts of feed rollers 12 and 13, as shown in Figs. 3 and 5. By these means the feed rollers 12 and 13 are driven in opposite directions or so that the upper peripheries thereof move inwardly toward one another at the desired speed. The drive of the mechanism on the carrier, as shown in Fig. 1, is from a pulley 161 on the shaft 162 of the threshing cylinder. A belt 163 which passes over the pulley 157, acting as a tightener and also driven thereby, runs to a pulley 165 on a shaft 166 journaled transversely of the machine in bearings formed on bracket members 167 provided for that purpose. The pulley 165 will be a governor pulley of any well known construction which will not effect driving action upon shaft 166 until the proper speed of the threshing cylinder has been attained. As shown in Fig. 3, shaft 166 has thereon a pulley 168 which is connected by a belt 169 with a pulley 41 on shaft 40.

The operation of my device has been quite fully given in connection with the detailed description thereof.

The carrier trough will be positioned as may be required in relation to the stack to be threshed. If it is desired to let the trough descend by gravity the shoe 100 will be placed in contact with the grain of the stack and the drum 87 will be unclutched from the shaft 86.

After the machine has been properly speeded up the bundles will be laid within the lower portion of carrier trough 54, and said bundles will be carried by means of the prongs 63 on chain 61 up the carrier trough and beneath to cutter knives 107 where the bands will be cut. By reason of the fact that the chains 130 on the yoke member or float 127 are moving more rapidly than the feeder chain 61, as the bundle is fed beneath the float the top thereof will be stripped off more rapidly than the bottom and delivered within the mouth of the hood 28 thus spreading and making uniform the feed of the grain which will thereafter pass through the circular aperture at the bottom of hood 28 to the feed rollers 12 and 13 from which the grain is finally delivered to the threshing cylinder 151. It is to be noted that, in view of the fact that the aperture at the bottom of ring 22 is perfectly round and centers above the intermediate point between the feed rollers 12 and 13, it is absolutely immaterial as regards the feed of grain in what position the hood 28 and carrier trough 54 may be. It is practicable for said hood and carrier, where but one is used, as is contemplated by me, that said carrier may occupy any position from the extreme rear at one side entirely around the front of the machine to the extreme rear at the other side, making a sweep of but little less than the entire circumference of 360°, in any position of which the ultimate feed of grain to the threshing cylinder will always be identically the same. Of course, if two hoods and carriers are employed the sweep of each of such carriers will be principally limited to one side although it would still be possible for both carriers to point ahead to a stack on either side of the machine.

When the cut bundles of grain are fed beneath the chains 130 of the float 127 said bundles will tend to lift said float and thereby to rock the arm 132 and the trip member 135; and when the amount of grain has become sufficient to lift the float above a certain point, that is, when the feed of grain has become too great, the trip member 135 will be swung so as to cause the trigger 136 to move the finger 138 into the path of arm 143, thereby to release the clutch and disconnect the feeding operation of chain 61. Almost immediately the chains 130 will have stripped off enough straw from the top of the bundles to permit the float to drop sufficiently to cause finger 138 to be swung back so as to engage member 146 and re-clutch the sprocket 60 to its driving member to cause resumption of feeding action of chain 61.

I claim:

1. In combination with the threshing cylinder of a grain separator a rotatable hood having a contracted aperture directly above the threshing cylinder, a pair of feed and retarding rollers between the said aperture and the threshing cylinder for receiving the grain from the hood and delivering it to the threshing cylinder and located so that the delivery space between the feed rollers falls in a vertical plane extending between the axis of the threshing cylinder and the throat of the threshing concave, and means to deliver bundles of grain into said hood.

2. In combination with the threshing cylinder and concave of a grain separator, a pair of feed and retarding rollers located above said threshing cylinder with their axes in a horizontal plane and their coöperating adjacent peripheries positioned to deliver grain in a vertical plane between the axis of the threshing cylinder and the concave, a pair of rotatable hoods each having a contracted delivery aperture, the centers of said apertures being substantially in the plane of delivery of the said rollers and the combined width of said apertures extending along the full length of the delivery portions of the rollers, and independent means for delivering bundles of grain into each of said hoods.

In testimony whereof I affix my signature in the presence of two witnesses.

ANDREW J. PETERSON.

Witnesses:
F. A. WHITELEY,
H. A. BOWMAN.

Copies of this patent may be obtained for five cents each, by addressing the "Commissioner of Patents, Washington, D. C."